(12) United States Patent
Jeong et al.

(10) Patent No.: US 12,170,729 B2
(45) Date of Patent: Dec. 17, 2024

(54) METHOD AND SYSTEM FOR PROVIDING QUANTUM RANDOM NUMBER ON BASIS OF QUANTUM ENTROPY SOURCE

(71) Applicant: EYL INC., Yongin-si (KR)

(72) Inventors: Bu Suk Jeong, Gyeonggi-do (KR); Dae Hyun Nam, Seoul (KR); Jung Hyun Baik, Seongnam-si (KR); Seong Joon Cho, Seongnam-si (KR); Kang Won Suh, Daejeon (KR)

(73) Assignee: EYL INC., Yongin-si (KR)

( * ) Notice: Subject to any disclaimer, the term of this patent is extended or adjusted under 35 U.S.C. 154(b) by 309 days.

(21) Appl. No.: 17/761,434

(22) PCT Filed: Sep. 17, 2020

(86) PCT No.: PCT/KR2020/012542
§ 371 (c)(1),
(2) Date: Mar. 17, 2022

(87) PCT Pub. No.: WO2021/054734
PCT Pub. Date: Mar. 25, 2021

(65) Prior Publication Data
US 2022/0353071 A1 Nov. 3, 2022

(30) Foreign Application Priority Data
Sep. 17, 2019 (KR) .................. 10-2019-0114164

(51) Int. Cl.
*H04L 9/08* (2006.01)
*G06N 10/60* (2022.01)
*H04L 9/06* (2006.01)

(52) U.S. Cl.
CPC .......... *H04L 9/0869* (2013.01); *G06N 10/60* (2022.01); *H04L 9/0827* (2013.01);
(Continued)

(58) Field of Classification Search
CPC ......... H04L 9/06; H04L 9/065; H04L 9/0656; H04L 9/0662; H04L 9/08; H04L 9/0816;
(Continued)

(56) References Cited

U.S. PATENT DOCUMENTS 10,402,172 B1 * 9/2019 Mandich ............... H04L 9/0858
2015/0089230 A1 3/2015 Niset et al.
(Continued)

FOREIGN PATENT DOCUMENTS

JP 200639997 A 2/2006
KR 1020150117253 A 10/2015
(Continued)

OTHER PUBLICATIONS

Menezes et al., "Handbook of Applied Cryptography"; CRC Press; Jun. 1996; pp. 1-794.
(Continued)

*Primary Examiner* — D'Arcy Winston Straub
(74) *Attorney, Agent, or Firm* — NKL Law; Byungwoong Park

(57) ABSTRACT

A method and a system of providing a quantum random number based on a quantum entropy source. The method includes generating a quantum random number and providing the quantum random number to a device. The generating of the quantum random number based on the quantum entropy source includes determining, by a management unit, whether quantum random numbers stored in a storage are insufficient; generating a quantum random number based on the quantum entropy source using a quantum random number generator provided in a production unit in response to a determination that the quantum random numbers are insufficient; verifying, by a verification unit, the generated quantum random number based on NIST SP800-90B and SP800-22; and in response to quality of the generated quantum (Continued)

number satisfying a criterion, storing the verified quantum random number in the storage.

2 Claims, 4 Drawing Sheets

(52) U.S. Cl.
CPC .......... *H04L 9/0852* (2013.01); *H04L 9/0662* (2013.01); *H04L 2209/08* (2013.01); *H04L 2209/26* (2013.01)

(58) Field of Classification Search
CPC ................ H04L 9/0819; H04L 9/0827; H04L 9/0852; H04L 9/0861; H04L 9/0869; G06N 10/60
See application file for complete search history.

(56) References Cited

U.S. PATENT DOCUMENTS

| | | | | |
|---|---|---|---|---|
| 2016/0328211 | A1* | 11/2016 | Nordholt | G06F 7/588 |
| 2017/0063827 | A1* | 3/2017 | Ricardo | H04L 63/083 |
| 2018/0068305 | A1* | 3/2018 | Baik | G06Q 20/327 |
| 2020/0403787 | A1* | 12/2020 | Islam | H04L 9/0852 |

FOREIGN PATENT DOCUMENTS

| | | | |
|---|---|---|---|
| KR | 1020180034242 A | | 4/2018 |
| KR | 1020190034789 A | | 4/2019 |
| KR | 101981623 B1 | | 5/2019 |

* cited by examiner

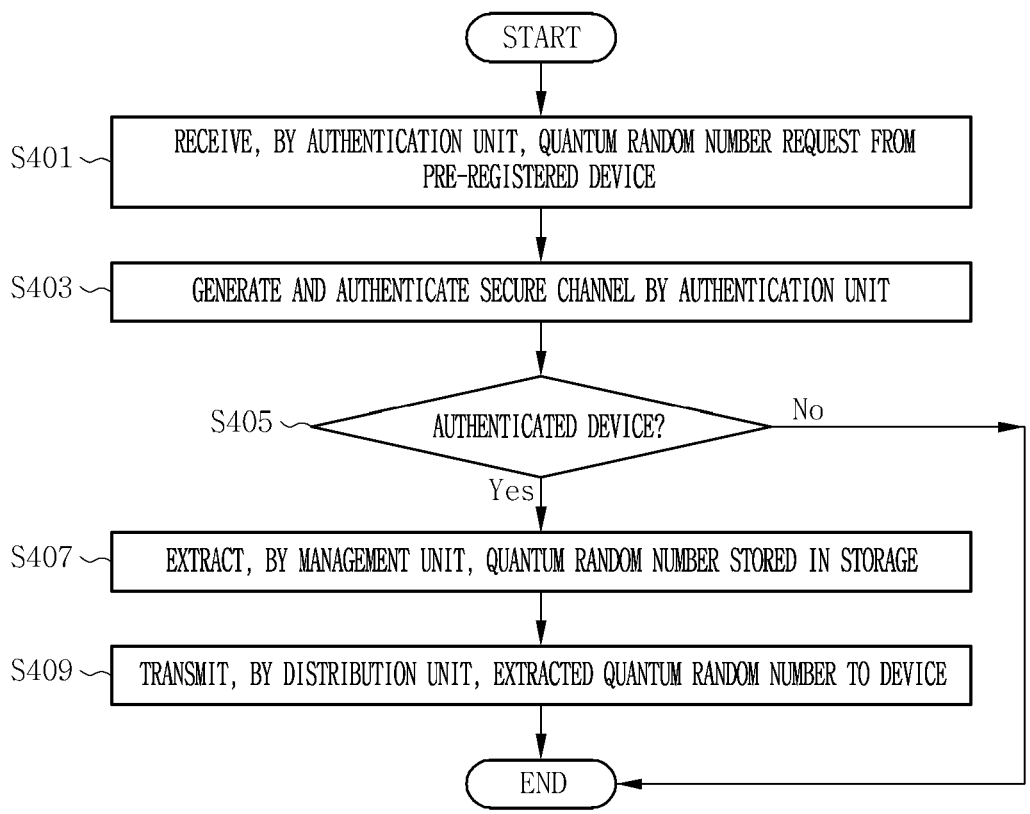

METHOD AND SYSTEM FOR PROVIDING QUANTUM RANDOM NUMBER ON BASIS OF QUANTUM ENTROPY SOURCE

FIELD

The present disclosure relates to a method of providing a quantum random number based on a quantum entropy source, and more particularly, to a method and a system of encrypting a quantum random number, generated based on a quantum entropy source, using a symmetric key and stably providing the quantum random number to a system and an IoT device such as a cloud, an Internet of Things (IoT) device, and a Simple Message Service (SMS) One Time Password (OTP) server, which are in need of a true random number generated in the quantum random entropy source.

BACKGROUND

An IoT device cannot structurally generate a cryptographic random number with a high entropy by itself. Meanwhile, there is a problem in generating cryptographic random numbers with high security in resource-constrained IoT-class devices that have little chance of good randomness, especially to collect local entropy before starting network communication. In addition, it is good to generate random numbers based on an unpredictable physical phenomenon, such as the best quantum effect of true randomness, but it is difficult to apply an expensive apparatus to a small IoT device.

As related arts, there are Korean Patent Application Publication No. 10-2015-0117253, which is titled "METHOD AND APPARATUS FOR GENERATING RANDOM NUMBERS USING PHYSICAL ENTROPY SOURCE", and Korean Patent No. 10-1981623, which is titled "LIGHT-WEIGHT RANDOM NUMBER HEALTH TEST APPARATUS".

SUMMARY

The present disclosure provides a system and a method of generate a quantum random number based on an unpredictable quantum entropy source, verify the quality of the generated quantum random number based on NIST SP 800-90B and SP 800-22, and verify the quantum random number To provide a system and method of stably providing quantum random numbers to IoT devices, cloud services, and SMS OTP systems through an encryption channel.

In an aspect, a method of providing a quantum random number based on a quantum entropy source is provided. The method includes generating a quantum random number and providing the quantum random number to a device. The generating of the quantum random number based on the quantum entropy source includes determining, by a management unit, whether quantum random numbers stored in a storage are insufficient; generating a quantum random number based on the quantum entropy source using a quantum random number generator provided in a production unit in response to a determination that the quantum random numbers are insufficient; verifying, by a verification unit, the generated quantum random number based on NIST SP800-90B and SP800-22; and in response to quality of the generated quantum number satisfying a criterion, storing the verified quantum random number in the storage.

In another aspect, a system of providing a quantum random number based on a quantum entropy source is provided. The system includes a plurality of devices and a quantum random number providing apparatus. The quantum random number providing apparatus includes: an authentication unit configured to, in response to receiving a quantum entropy source request from the device, create a secure channel and perform authentication; a distribution unit configured to transmit a quantum random number extracted from a storage to the device; a management unit configured to manage and control authentication statistics of the authentication unit, determine whether quantum random numbers stored in the storage are insufficient, and control a quantum random number generator to generate a quantum random number in response to a determination that the quantum random numbers are insufficient; and a verification unit configured to verify quality of the generated quantum random number.

According to the present disclosure has a quantum random number requested by an IoT device is stably provided to the IoT device and the IoT device generates a high-level encryption key with the received quantum random number to create a secure channel, thereby enhancing security.

In addition, as a quantum random number with a verified quality of a quantum entropy sources is stored based on NIST SP 800-90B and SP 800-22 and the generated quantum random number is stably provided to target devices such as cloud service, an SMS OTP systems, and IoT devices that have requested the quantum random number, security between devices may be enhanced without a separate cryptographic random number generating system.

BRIEF DESCRIPTION OF THE DRAWINGS

FIG. 4 is a diagram illustrating a method of providing a quantum random number based on a quantum entropy source according to an embodiment of the present disclosure.

DETAILED DESCRIPTION

Figure 1:
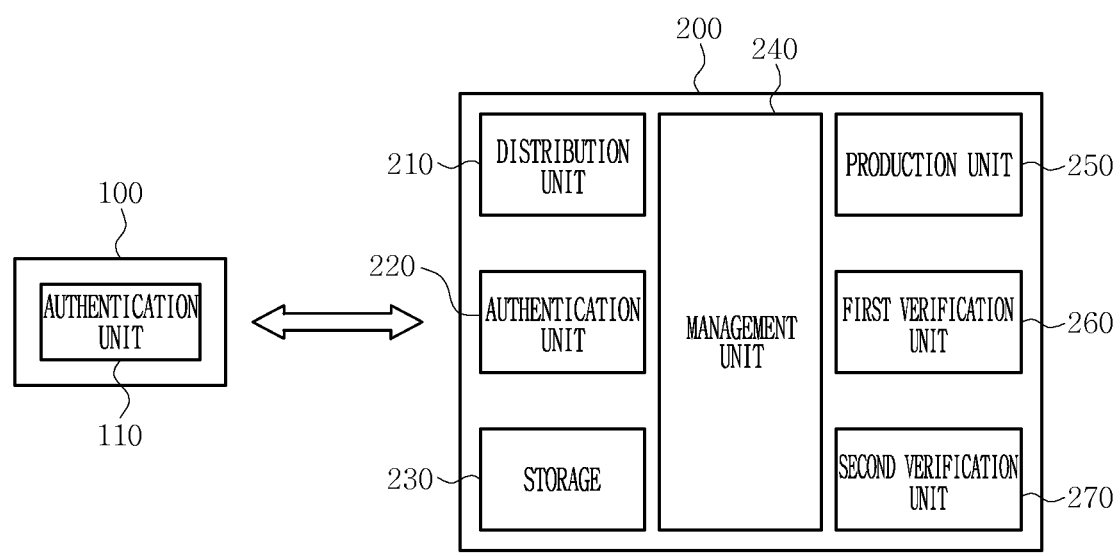
FIG. 1 is a block diagram of a system of providing a quantum random number based on a quantum entropy source according to an embodiment of the present disclosure.

While a specific structural or functional description with respect to embodiments according to the present disclosure disclosed in this specification is merely provided for the purpose of describing the embodiments of the present disclosure, there are various modifications capable of replacing the embodiments, and the present disclosure is not limited to the embodiments described in this specification.

While the embodiments according to the present disclosure is susceptible to various modifications and alternative forms, specific embodiments thereof are shown by way of examples in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure.

The terminology used herein is for the purpose of describing particular embodiments only and is not intended to be limiting of the present disclosure. The singular forms are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Hereinafter, embodiments of the present disclosure will be described in detail with reference to the accompanying drawings.

FIG. 1 is a block diagram of a system of providing a quantum random number based on a quantum entropy source according to an embodiment of the present disclosure.

Referring to FIG. 1, a system of providing a quantum entropy source includes a device 100 and a quantum entropy source providing apparatus 200.

The device 100 may be at least one of an Internet of Things (IoT) device, a Simple Message Service (SMS) One Time Password (OTP), an IoT sensor, and a Point Of Sale (POS) device, and may be a small device such as a sensor network, a smart home, an embedded operating system, or a cloud-based device.

The system 200 of providing a quantum entropy source includes a distribution unit 210, an authentication unit 220, a storage 230, a management unit 240, a production unit 250, a first verification unit 260 (SP800-90B), and a second verification unit 270 (SP800-22). That is, the system 200 of providing a quantum entropy source may generate a quantum random number based on an entropy source based on an unpredictable physical phenomenon and provide the generated quantum random number to a small IoT device which has requested the quantum random number.

The distribution unit 210 may transmit a verified quantum random number, which is extracted from the storage, to the device 100. The distribution unit 210 may provide the quantum random number to the device 100 in real time by distributing a load.

Upon receiving a request for a quantum random number from the device 100, the authentication unit 220 creates a secure channel with an authenticator 110 of the device 100 and performs authentication. In this case, the authentication unit 220 may create an End to End (E2E) secure channel with the authenticator 110 of the device 100 and maintain the mutual authentication channel.

The storage 230 may store quality-verified quantum random numbers in NIT SP 800-90B and SP 800-22.

The management unit 240 may manage and maintain statistics related to the quality and production of quantum entropy sources and statistics related to authentication. The management unit 240 may determine whether quantum entropy sources stored in the storage is insufficient. The management unit 240 may determine whether generated quantum random numbers are insufficient, and when the generated quantum random numbers are insufficient, the management unit 240 may control a quantum random number generator to generate a quantum random number.

The production unit 250 may be provided with a quantum random number generator to generate a generated quantum random number and generate a quantum random number based on a generated quantum entropy source. The production unit 250 may generate a quantum random number under the control of the management unit. The quantum random number may be generated using a random pulse that occurs corresponding to an emission time of alpha particles which are discharged when an atomic nucleus naturally collapses.

The first verification unit 260 (SP800-90B) and the second verification unit 270 (SP800-22) may verify the generated quantum random number. The first verification unit and the second verification unit may verify the quality of a random entropy source based on SP 800-90B and SP 800-22, which are the international standards for Random Number Generator (RNG) security of the U.S. National Institute of Standards and Technology (NIST). The first verification unit and the second verification unit may verify the generated quantum random number and may discard the quantum random number when the quality of the generated quantum random number is lower than a criterion level.

Figure 2:
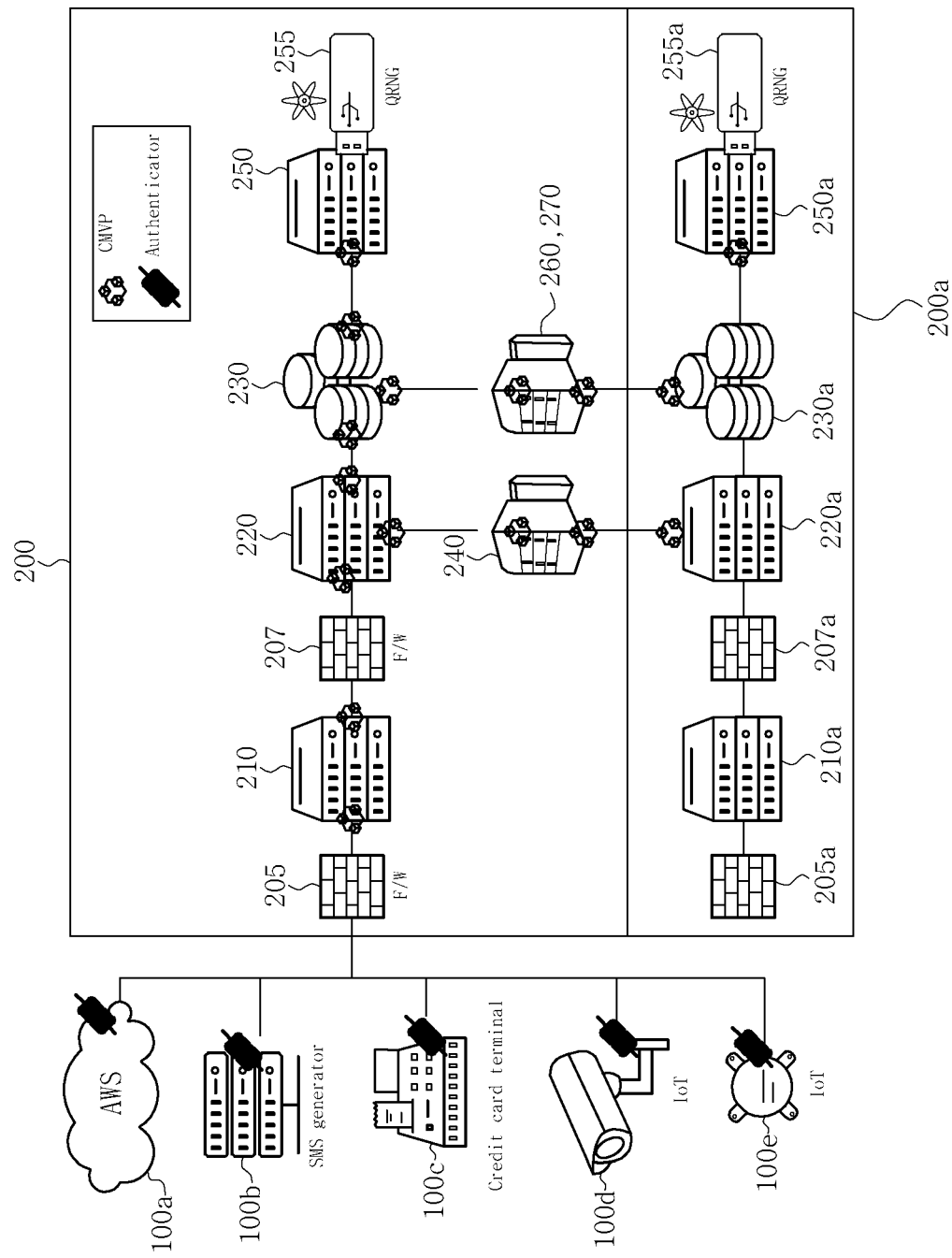
FIG. 2 is a conceptual diagram of a system of providing a quantum random number based on a quantum entropy source according to an embodiment of the present disclosure.

FIG. 2 is a conceptual diagram of a system of providing a quantum random number based on a quantum entropy source according to an embodiment of the present disclosure.

A system of providing a quantum entropy source may include a plurality of devices, for example, a cloud 100 *a*, an SMS generator 100 *b*, a credit card terminal 100 *c*, a CCTV 100 *d*, and an IoT sensor 100 *e*. The system of providing a quantum entropy source may include a system 200 of providing a quantum random number and a system duplication apparatus 200 *a* to provide an uninterruptible service. The system 200 of providing a quantum random number includes a first firewall 205, a distribution unit 210, a second firewall 207, an authentication unit 220, a storage 230, a management unit 240, a production unit 250, and a verification unit 260 and 270, and the system duplication apparatus 200 *a* includes a first firewall 205 *a*, a distribution unit 210 *a*, a second firewall 207 *a*, an authentication unit 220 *a*, a storage 230 *a*, a production unit 250 *a*, and a quantum random number generator 255 *a*. The production unit 250 may be provided with the quantum random number generator 255 to generate a quantum random number.

Figure 3:
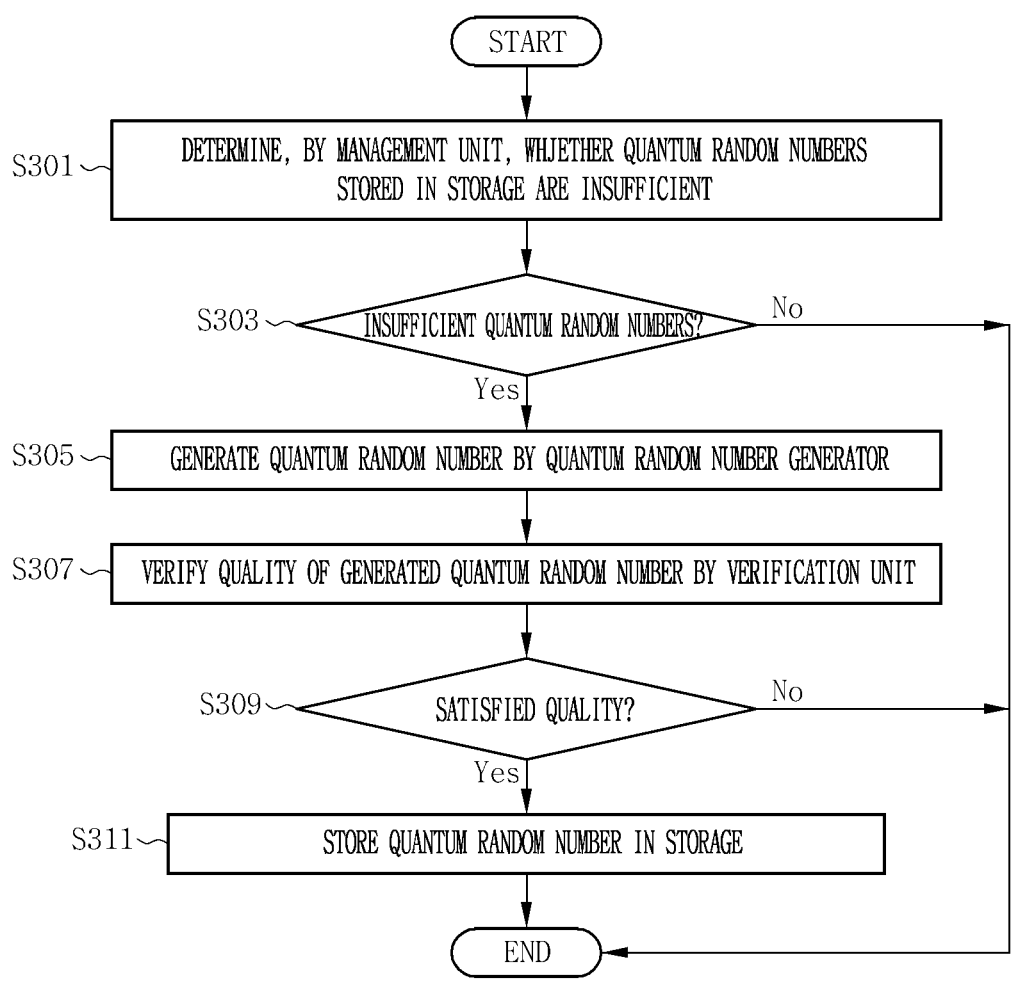
FIG. 3 is a diagram illustrating a method of generating a quantum random number based on a quantum entropy source according to an embodiment of the present disclosure.

FIG. 3 is a diagram illustrating a method of generating a quantum random number based on a quantum entropy source according to an embodiment of the present disclosure.

Referring to FIG. 3, the method of generating a quantum entropy source includes generating a quantum entropy source and providing the quantum entropy source to a device.

In generating the quantum entropy source, the management unit determines whether quantum entropy sources stored in the storage are insufficient in operation S301. The management unit determines whether the quantum entropy sources are insufficient in operation S303, and when the quantum entropy sources are insufficient, the production unit generates a quantum random number in operation S305. In this case, the quantum random number may be generated using a random pulse that occurs corresponding to an emission time of alpha particles that are discharged when an atomic nucleus naturally collapses.

The verification unit verifies the quality of the generated quantum random number in operation S307. In this case, the verification unit may verify the quality of the quantum entropy source based on NIST SP 800-90B and SP 800-22, which are the international standards for RNG (Random Number Generator) security of the U.S. National Institute of Standards and Technology (NIST).

When the quality of the generated quantum random number satisfies a criterion in operation S309, the quantum random number is stored in the storage in operation S311.

FIG. 4 is a diagram illustrating a method of providing a quantum random number based on a quantum entropy source according to an embodiment of the present disclosure. Referring to FIG. 4, the method of providing a quantum random number includes generating a quantum random number and providing the quantum random number to a device. In providing the quantum random number to the device, when an authentication unit of a system of providing a quantum random number receives a request for a quantum random number from a pre-registered device in operation S401, the authentication unit creates a secure channel and performs authentication in operation S403.

In this case, when the device is an authenticated device in operation S405, the management unit extracts a quantum random number stored in a storage in operation S407, and a distribution unit transmits the extracted quantum random number to the device in operation S409.

Although the present disclosure has been described in connection with the embodiments illustrated in the drawings, the embodiments are merely examples. It should be appreciated to those skilled in the art that various modifications and equivalents to these embodiments are possible. Therefore, the technical scope of the present disclosure should be decided by the technical spirit of the appended claims.

What is claimed is:

1. A method of providing quantum random numbers based on a quantum entropy source, the method comprising:
generating a plurality of quantum random numbers and providing the plurality of quantum random numbers to a device, wherein the generating of the plurality of quantum random numbers based on the quantum entropy source comprises:
determining, by a management unit comprising a processor and one or more memory devices communicatively coupled to the processor stores instructions operable when executed by the processor, whether quantum random numbers stored in a storage are under a predetermined quantity level;
generating at least one first supplemental quantum random number based on the quantum entropy source using a quantum random number generator in response to a determination that the plurality of quantum random numbers are under the predetermined quantity level;
verifying, by a verification unit comprising a processor and one or more memory devices communicatively coupled to the processor stores instructions operable when executed by the processor, the generated quantum random numbers which comprise the plurality of quantum random numbers and the at least one first supplemental quantum random number based on a predetermined quality level; and
in response to quality of the generated quantum numbers satisfying the predetermined quantity level, storing the verified quantum random numbers in the storage,
wherein the providing of the plurality of quantum random numbers to the device comprises:
receiving a quantum random number request from a plurality of end devices;
generating and authenticating a secure channel;
in response to the plurality of end devices being authenticated devices, encrypting the plurality of quantum random numbers stored in the storage and providing the encrypted quantum random numbers through an encryption channel; and
transmitting, by a distribution unit comprising a processor and one or more memory devices communicatively coupled to the processor stores instructions operable when executed by the processor, the encrypted quantum random numbers to the plurality of end devices that have sent the quantum random number request,
wherein the generated quantum random numbers are verified based on the predetermined quality level, and at least one quantum random number not satisfying the predetermined quantity level is discarded and at least one second supplemental quantum random number is generated in response to the quality of the at least one quantum random number not satisfying the predetermined quantity level, and
wherein the plurality of quantum random numbers generated by the quantum random number generator is a quantum random number generated using a random pulse that occurs corresponding to an emission time of alpha particles which are discharged when an atomic nucleus naturally collapses,
wherein
the plurality of end devices comprise a cloud, an SMS generator, a credit card terminal, a CCTV and an IoT sensor,
each of the cloud, the SMS generator, the credit card terminal, the CCTV and the IoT sensor communicate comprises an authenticator,
the system further comprises a first fire wall and a second fire wall,
the cloud, the SMS generator, the credit card terminal, the CCTV and the IoT sensor communicate with the distribution unit via the first fire wall,
the distribution unit communicate with the authentication unit via the second fire wall,
the system further comprises a duplication apparatus,
the duplication apparatus comprises a supplemental first firewall, a supplemental distribution unit, a supplemental second firewall, a supplemental authentication unit, a supplemental storage and a supplemental quantum random number generator,
the authentication unit and the supplemental authentication unit communicate with each other via the management unit, and
the storage and the supplemental storage communicate with each other via the verification unit.

2. A system of providing a quantum random numbers based on a quantum entropy source, the system comprising a plurality of devices and a quantum random number providing apparatus,
wherein the quantum random number providing apparatus comprises:
an authentication unit comprising a processor and one or more memory devices communicatively coupled to the processor stores instructions operable when executed by the processor to, in response to receiving a quantum entropy source request from a device, create a secure channel and perform authentication;
a distribution unit comprising a processor and one or more memory devices communicatively coupled to the processor stores instructions operable when executed by the processor to transmit at least one quantum random number extracted from a storage to the device;
a management unit comprising a processor and one or more memory devices communicatively coupled to the processor stores instructions operable when executed by the processor to manage and control authentication statistics of the authentication unit for creating the secure channel and performing the authentication, determine whether quantum random numbers stored in the storage are under the predetermined quantity level, and control a quantum random number generator to generate at least one first supplemental quantum random number in response to a determination that a plurality of quantum random numbers in the storage are under the predetermined quantity level; and a verification unit comprising a processor and one or more memory devices communicatively coupled to the processor stores instructions operable when executed by the processor to verify quality of the generated quantum random number numbers which comprise the plurality of quantum random numbers and the at least one first supplemental quantum random number, wherein when providing of the plurality of quantum random numbers to the device, a quantum random number request is received from a plurality of end devices;

a secure channel is generated and authenticated;

in response to the plurality of end devices being authenticated devices, the plurality of quantum random numbers stored in the storage is encrypted and the encrypted quantum random numbers through an encryption channel is provided; and the encrypted quantum random numbers are transmitted, by a distribution unit comprising a processor and one or more memory devices communicatively coupled to the processor stores instructions operable when executed by the processor, to the plurality of end devices that have sent the quantum random number request, wherein the generated quantum random numbers are verified based on the predetermined quality level, and at least one quantum random number not satisfying the predetermined quantity level is discarded and at least one second supplemental quantum random number is generated in response to the quality of the at least one quantum random number not satisfying the predetermined quantity level, wherein the plurality of quantum random numbers generated by the quantum random number generator is a quantum random number generated using a random pulse that occurs corresponding to an emission time of alpha particles which are discharged when an atomic nucleus naturally collapses, wherein the plurality of end devices comprise a cloud, an SMS generator, a credit card terminal, a CCTV and an IoT sensor, each of the cloud, the SMS generator, the credit card terminal, the CCTV and the IoT sensor communicate comprises an authenticator, the system further comprises a first fire wall and a second fire wall, the cloud, the SMS generator, the credit card terminal, the CCTV and the IoT sensor communicate with the distribution unit via the first fire wall, the distribution unit communicate with the authentication unit via the second fire wall, the system further comprises a duplication apparatus, the duplication apparatus comprises a supplemental first firewall, a supplemental distribution unit, a supplemental second firewall, a supplemental authentication unit, a supplemental storage and a supplemental quantum random number generator, the authentication unit and the supplemental authentication unit communicate with each other via the management unit, and the storage and the supplemental storage communicate with each other via the verification unit.

* * * * *